(No Model.)
J. WARING.
ELECTRIC LAMP.
No. 497,038.              Patented May 9, 1893.
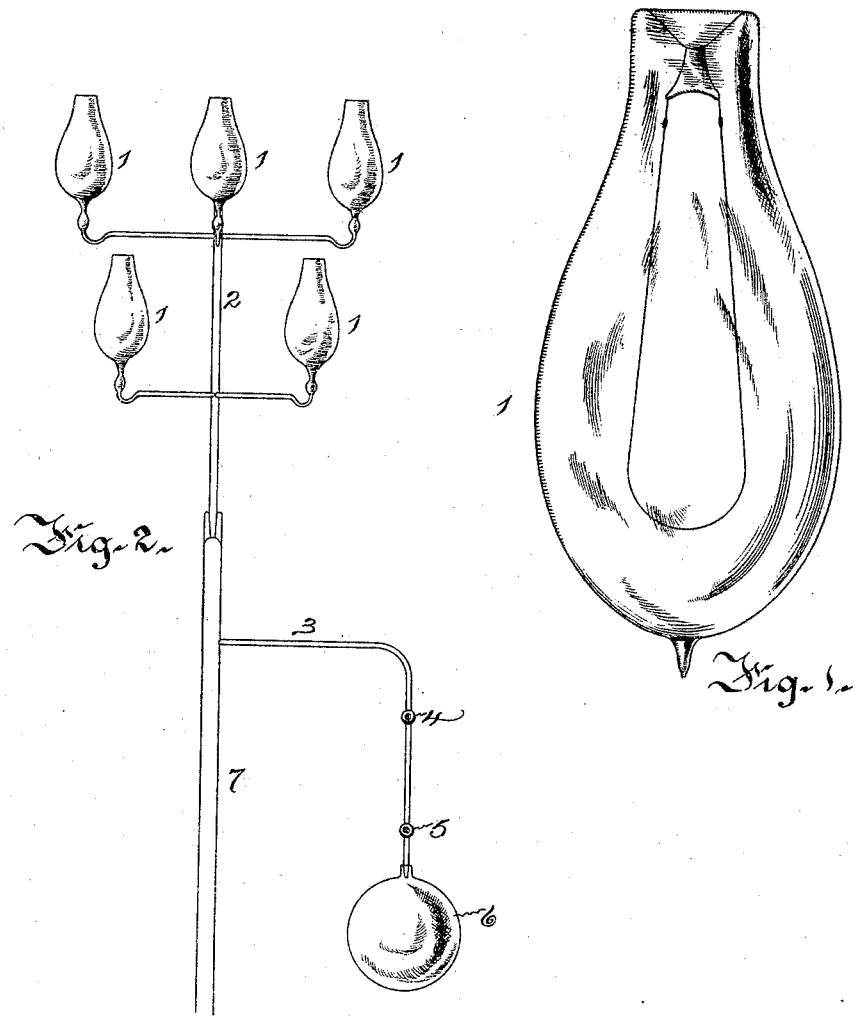
Witnesses:
C. E. Buckland.
Arthur B. Jenkins.
Inventor:
John Waring, by
Harry R. Williams
Atty.

UNITED STATES PATENT OFFICE.

JOHN WARING, OF MANCHESTER, ASSIGNOR TO THE WARING ELECTRIC COMPANY, OF HARTFORD, CONNECTICUT.

ELECTRIC LAMP.

SPECIFICATION forming part of Letters Patent No. 497,038, dated May 9, 1893.

Application filed January 4, 1893. Serial No. 457,231. (No model.)

*To all whom it may concern:*

Be it known that I, JOHN WARING, a citizen of the United States, residing at Manchester, in the county of Hartford and State of Connecticut, have invented certain new and useful Improvements in Electric Lamps, of which the following is a full, clear, and exact specification.

The invention relates to the class of lamps which have an inclosed conductor adapted to be raised to incandescence by electrical excitation, the object being to provide a lamp which will more perfectly maintain a uniform candle power throughout its life than prior lamps of this class.

It has been taught by high authorities and generally accepted by those familiar with the art, that if the carbon of an incandescent lamp is not placed in a vacuum, even though it is surrounded by a gas which does not chemically attack the carbon, the "air washing," or rapid passage of the molecules of gas over the highly heated surface of the carbon will produce a disintegration of the carbon. It has also been well known that if an incandescent carbon is surrounded by an atmosphere of hydrogen or nitrogen, the rapidly moving molecules of gas will carry off the heat from the carbon and thus require the expenditure of much more energy to keep the carbon at the desired state of incandescence. It has been accordingly supposed that it was absolutely necessary to place the carbon in a nearly perfect vacuum, that is to say, in a sealed chamber having an interior gas pressure of only about one millionth of an atmosphere, in order to avoid the above difficulties and render the carbon stable.

I have discovered that if a carbon in a sealed chamber is surrounded by a gas of great specific density, that is to say, a gas most of whose elements have a high atomic weight— the dissipation of energy by loss of heat from the carbon is reduced, so that as a factor it may be ignored; also that, by using as a surrounding medium such a gas which has no injurious chemical effects on the carbon, the disintegration of the carbon caused by high temperature is probably lessened as the blackening of the glass of the lamp is materially lessened and the stability of the carbon is proportionately increased and a lamp is produced which is efficient at the commencement of its life, and which will maintain its efficiency much longer than a lamp having its carbon in a vacuum. My experience shows that these advantages above described are obtained by enveloping the carbon with a gas consisting of the vapor of bromine, or of the vapor of iodine, or of a mixture of both, the atomic weight of these elements being high. Such a lamp may be made as illustrated in the accompanying drawings, wherein—

Figure 1 is an ordinary lamp, and Fig. 2 a fork and connections.

1 indicates the lamp with a common carbon and connection; 2 an ordinary tubular fork to which the lamp may be connected in the usual manner; 3 a tube provided with suitable controlling cocks 4 and 5, leading to a reservoir 6 containing the gas of great mean molecular weight with which the carbon is to be enveloped; and 7 a tube leading to an air pump. The globes may be filled with the gas by partially withdrawing the atmospheric air by means of the pump, and then opening the cocks controlling the passage from the gas reservoir. The gas may be generated by heat or otherwise, bromine for instance vaporizing easily, but iodine requiring heat. This gas admitted to the globes and diluted by the air remaining in them is then partially withdrawn and more gas allowed to enter, this process being repeated until the extent to which the desired gas is diluted with foreign gases has become practically infinitesimal. If preferred, the atmospheric air may be at first exhausted as nearly as possible and the desired gas then admitted around the carbon.

The amount of gas to be admitted will in practice vary with the size of the inclosing chamber, with the nature of the gas, and probably also with the nature of the other elements of the lamp. In either of the above processes it is easy to regulate, in a lamp of given construction, the amount of gas admitted, so as to give the best results.

The process above indicated for forming these lamps is more specifically described and claimed in my application for patent, Serial No. 470,967, filed April 19, 1893.

I claim as my invention—

1. The combination of a carbon to be raised to incandescence by electrical excitement, an enveloping gas composed wholly or largely of an element or elements of high atomic weight, to wit, as high as that of bromine, a sealed chamber inclosing both the carbon and surrounding gas, and electrical conductors passing through the walls of said chamber and connecting with the carbon, for the purpose specified.

2. The combination of a carbon to be raised to incandescence by electrical excitement, an enveloping gas consisting wholly or largely of bromine, or of iodine, or of both, a sealed chamber inclosing both the carbon and surrounding gas, and electrical conductors passing through the walls of said chamber and connecting with the carbon, for the purpose specified.

JOHN WARING.

Witnesses:
C. E. BUCKLAND,
H. R. WILLIAMS.